United States Patent
Shimada (10) Patent No.: US 9,094,672 B2
(45) Date of Patent: Jul. 28, 2015

(54) STEREO PICTURE GENERATING DEVICE, AND STEREO PICTURE GENERATING METHOD

(71) Applicant: Fujitsu Limited, Kawasaki-shi, Kanagawa (JP)

(72) Inventor: Satoshi Shimada, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 306 days.

(21) Appl. No.: 13/849,013

(22) Filed: Mar. 22, 2013

(65) Prior Publication Data

US 2013/0222556 A1 Aug. 29, 2013

Related U.S. Application Data

(63) Continuation of application No. PCT/JP2010/066450, filed on Sep. 22, 2010.

(51) Int. Cl.
*H04N 13/02* (2006.01)
*G06T 7/00* (2006.01)
*G06K 9/00* (2006.01)

(52) U.S. Cl.
CPC .............. *H04N 13/021* (2013.01); *G06T 7/002* (2013.01); *H04N 13/0239* (2013.01); *H04N 13/0246* (2013.01)

(58) Field of Classification Search
CPC .......... H04N 13/0055; H04N 13/0221; H04N 13/0296; H04N 13/0431; H04N 13/0003; H04N 13/021; H04N 13/0239; H04N 13/0438; H04N 13/0217; H04N 9/097; H04N 17/002; H04N 9/093; G01C 11/02; G02B 27/32
USPC ................ 348/50, 51, 175; 382/100
See application file for complete search history.

(56) References Cited

U.S. PATENT DOCUMENTS 6,473,536 B1* 10/2002 Chiba et al. .................. 382/284
6,661,927 B1* 12/2003 Suarez et al. ................. 382/240

(Continued)

FOREIGN PATENT DOCUMENTS

JP 2008-186145 8/2008
JP 2010-128820 6/2010

OTHER PUBLICATIONS

International Search Report of Corresponding PCT Application PCT/JP2010/066450 mailed Nov. 9, 2010.

(Continued)

*Primary Examiner* — Sath V Perungavoor
*Assistant Examiner* — Howard D Brown, Jr.
(74) *Attorney, Agent, or Firm* — Staas & Halsey LLP (57) ABSTRACT

A stereo picture generating device includes: a feature point extracting unit that extracts feature points from a first picture; a tracking unit that calculates coordinate of each point on a second picture corresponding to each of the feature points; a parameter determining unit that determines plane projective transformation coefficients which include at least one coefficient representing a rotational transfer component and at least one coefficient representing a translation component so as to minimize an evaluation value that includes distance between each of transformed feature points, which are obtained by plane-projective-transforming the feature points on the first picture, and the corresponding point on the second picture, and a weighting term having a value depending on the rotational transfer component; and a transforming unit that plane-projective-transforms the first picture by using the plane projective transformation coefficients, to generate a pair of plane-projective-transformed picture and the second picture as a stereo picture.

7 Claims, 5 Drawing Sheets

(56) References Cited

U.S. PATENT DOCUMENTS

| | | | |
|---|---|---|---|
| 8,270,770 B1* | 9/2012 | Jin et al. | 382/294 |
| 2003/0072406 A1* | 4/2003 | Yang | 378/4 |
| 2003/0202637 A1* | 10/2003 | Yang | 378/210 |
| 2005/0129325 A1* | 6/2005 | Wu | 382/254 |
| 2008/0253606 A1* | 10/2008 | Fujimaki et al. | 382/100 |
| 2009/0167844 A1* | 7/2009 | Seki et al. | 348/47 |
| 2009/0169052 A1* | 7/2009 | Seki et al. | 382/103 |
| 2010/0020178 A1* | 1/2010 | Kleihorst | 348/175 |
| 2011/0235899 A1 | 9/2011 | Tanaka | |
| 2012/0128204 A1* | 5/2012 | Aoba | 382/103 |
| 2012/0281104 A1* | 11/2012 | Ohmiya et al. | 348/208.6 |

OTHER PUBLICATIONS

Richard I. Hartley, "Theory and Practice of Projective Rectification", International Journal of Computer Vision, November vol. 35, No. 2, 1999, pp. 115-127.

* cited by examiner

STEREO PICTURE GENERATING DEVICE, AND STEREO PICTURE GENERATING METHOD

CROSS-REFERENCE TO RELATED APPLICATION

This application is a continuation application and is based upon PCT/JP2010/066450, filed on Sep. 22, 2010, the entire contents of which are incorporated herein by reference.

FIELD

The present invention relates to, for example, a stereo picture generating device, a stereo picture generating method, and a computer program for generating a stereo picture on the basis of two pictures photographed for the same object in different directions.

BACKGROUND

Research for reproducing a three-dimensional image has been carried out. According to one known method for reproducing a three-dimensional image, two pictures photographed of the same object in different directions are displayed such that the two pictures are laid side-by-side to make right and left eyes of a viewer look at the two pictures respectively. A pair of the two pictures used in this manner is called a stereo picture.

In order to generate a stereo picture, for example, one camera at a first position is used to photograph a picture of a target object to create a first picture, and then, the camera is moved to a second position to photograph a picture of the target object to create a second picture. Alternatively, two cameras respectively arranged at the first and second positions photograph pictures of the target object to generate the first and second pictures. The first and second pictures become a pair for a stereo picture.

The two pictures included in the stereo picture are viewed by right and left eyes of a viewer respectively. For this reason, in order to regenerate a three-dimensional image of high quality, the images captured on the two pictures are preferably photographed in the same condition as in a condition that a viewer generally looks at the object. Right and left eyes of a human are positioned along a horizontal direction. For this reason, the first and second positions are preferably arranged in the horizontal direction, as well. Respective sight lines of the right and left eyes are approximately in parallel. For this reason, an optical axis of the camera at the first position, and an optical axis of the camera at the second position are preferably in parallel.

To accurately arrange the cameras at the first and second positions in such a manner, strict position alignment is performed. For this purpose, positions and postures of the cameras at first and second positions are measured, and in accordance with the result of the measurement, arrangement of the cameras is adjusted. In order to perform such strict alignment adjustment, for example, a worker uses a measuring device to make measurement, and in accordance with the result of the measurement, the worker performs various manual works for position adjustment of the cameras. Thus, it is expensive and takes time to create a stereo picture. Accordingly, it is often difficult to perform the strict alignment adjustment. As a result, a height of the camera at the first position is different from a height of the camera at the second position, the optical axis direction of the camera at the first position is different from the optical axis direction of the camera at the second position, or one of the pictures is displaced from the other of the pictures in a rotational direction around the optical axis.

In view of the above-described matters, techniques of transforming an image position on a picture to create a picture suitable for a stereo picture has been proposed (for example, Japanese Laid-open Patent Publication No. 2008-186145, and Richard I. Hartley, "Theory and practice of projective rectification" International Journal of Computer Vision, P. 115-127, No. 2, Vol. 35, 1999, November). According to such one of the techniques, by taking into consideration a property of the camera such as a focal length and distortion aberration of the camera, image positions on the picture is transformed so as to correct differences between heights, optical axis directions, and positions in the rotational direction around the optical axes of the cameras at the two positions at the time of photographing.

A picture processing device according to one example of such known techniques determines a rotational transformation equation or a rotational and translational transformation equation of plane projective transformation so that the corresponding feature points respectively extracted from the two pictures match each other. Then, the picture processing device uses the rotational transformation equation or the rotational and translational transformation equation to transform each position on the picture to generate a stereo picture.

A picture processing device according to another known technique transforms a picture to generate a stereo picture by taking epipolar geometry into consideration. When one target point of an object is photographed from two different picture-photographing positions, the epipolar geometry represents corresponding relationship on the picture between the target point and each of the photographing positions. Specifically, a line connecting the target point and the camera arranged at the first position is presented by a straight line when projected on the picture photographed by the camera arranged at the second position. Similarly, a line connecting the target point and the camera arranged at the second position is presented by a straight line when projected on the picture photographed by the camera arranged at the first position. The straight line projected on the picture is referred to as epipolar line. The device using the epipolar geometry takes such corresponding relationship into consideration, and obtains plane projective transformation coefficients for making the epipolar lines in parallel to transform at least one of the pictures. Thereby, it is possible to artificially create a pair of two pictures that are photographed in a state that the optical axes of the cameras are in parallel.

According to the technique of using the epipolar geometry, when the feature point on each picture corresponding to the target point is not accurately obtained, due to an error in extracting the feature point, accurate plane projective transformation coefficients may not be calculated. Further, according to this technique, due to picture distortion such as distortion aberration of an imaging optical system of the camera, accurate plane projective transformation coefficients may not be calculated.

According to a technique of obtaining the coefficients for the rotational transformation equation or the rotational and translational transformation equation such that the corresponding feature points between the two pictures match each other, a positional error is minimized for an entire of the plural pairs of the corresponding feature points. Accordingly, in this technique, even when the pairs of the corresponding feature points includes several erroneously correlated pairs of the feature points, relatively accurate coefficients can be obtained.

However, when an object has a certain depth in a front-to-back direction, a distance between the feature points that are extracted from the two pictures and that correspond to the points on the front side of the object is larger than a distance between the feature points that are extracted from the two pictures and that correspond to the points on the back side of the object. For this reason, in order to perform accurate transformation of image positions on the picture such that the pairs of the corresponding feature points on the two pictures match each other, nonlinear position transformation is normally used. The nonlinear position transformation transforms each position on the picture so as to adjust a transfer amount in accordance with a length to the object corresponding to the position.

Meanwhile, the positional transformation performed by the rotational transformation equation or the rotational and translational transformation equation is a linear transformation transforming a straight line into another straight line. Accordingly, when the object has a length in the front-to-back direction, in a picture transformed by the plane projective transformation coefficients determined on the basis of the feature points on the object, the image of the object may be distorted due to the transformation.

SUMMARY

According to one embodiment, a stereo picture generating device is provided. The stereo picture generating device includes: a feature point extracting unit that extracts a plurality of feature points from a first picture generated by photographing an object from a first position; a tracking unit that calculates coordinate of each point on a second picture generated by photographing the object from a second position different from the first position corresponding to each of the plurality of feature points, wherein each of the plurality of the feature points and the corresponding point on the second picture correspond to a same point on the object; a parameter determining unit that determines plane projective transformation coefficients which include at least one coefficient representing a rotational transfer component and at least one coefficient representing a translation component so as to minimize an evaluation value that includes distance between each of transformed feature points, which are obtained by plane-projective-transforming the feature points on the first picture by using the plane projective transformation coefficients, and the corresponding point on the second picture and a weighting term having a value depending on the rotational transfer component; and a transforming unit that plane-projective-transforms the first picture by using the plane projective transformation coefficients, to generate a pair of plane-projective-transformed picture and the second picture as a stereo picture.

According to another embodiment, a stereo picture generating method is provided. The stereo picture generating method includes: extracting a plurality of feature points from a first picture generated by photographing an object from a first position; calculating coordinate of each point on a second picture generated by photographing the object from a second position different from the first position corresponding to each of the plurality of feature points, wherein each of the plurality of the feature points and the corresponding point on the second picture correspond to a same point on the object; determining plane projective transformation coefficients which include at least one coefficient representing a rotational transfer component and at least one coefficient representing a translation component so as to minimize an evaluation value that includes distance between each of transformed feature points, which are obtained by plane-projective-transforming the feature points on the first picture by using the plane projective transformation coefficients, and the corresponding point on the second picture and a weighting term having a value depending on the rotational transfer component; and plane-projective-transforming the first picture by using the plane projective transformation coefficients, to generate a pair of plane-projective-transformed picture and the second picture as a stereo picture.

According to still another embodiment, A computer program for generating a stereo picture for causing a computer to generate a stereo picture is provided. The computer program causes the computer to execute: extracting a plurality of feature points from a first picture generated by photographing an object from a first position; calculating coordinate of each point on a second picture generated by photographing the object from a second position different from the first position corresponding to each of the plurality of feature points, wherein each of the plurality of the feature points and the corresponding point on the second picture correspond to a same point on the object; determining plane projective transformation coefficients which include at least one coefficient representing a rotational transfer component and at least one coefficient representing a translation component so as to minimize an evaluation value that includes distance between each of transformed feature points, which are obtained by plane-projective-transforming the feature points on the first picture by using the plane projective transformation coefficients, and the corresponding point on the second picture and a weighting term having a value depending on the rotational transfer component; and plane-projective-transforming the first picture by using the plane projective transformation coefficients, to generate a pair of plane-projective-transformed picture and the second picture as a stereo picture.

The object and advantages of the invention will be realized and attained by means of the elements and combinations particularly pointes out in the claims.

It is to be understood that both the foregoing general description and the following detailed description are exemplary and explanatory and are not restrictive of the invention, as claimed.

DESCRIPTION OF EMBODIMENTS

First, a problem of a stereo picture generated by plane projective transformation coefficients determined by the conventional technique will be described by way of example.

Figure 1A:
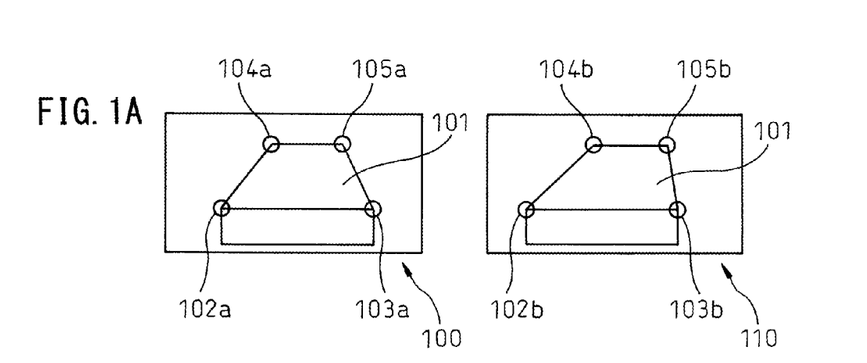
FIG. 1A illustrates an example of two pictures photographed from different positions.

FIG. 1A illustrates an example of images captured on two pictures photographed by two cameras that are arranged at two different positions respectively, such that optical axes of the two cameras are in parallel. On both of the first picture 100 and the second picture 110, the same object 101 is captured. The object 101 has a certain depth in a front-to-back direction. From each of the first picture 100 and the second picture 110, four corners 102a to 105a, and 102b to 105b of the object 101 have been extracted as the feature points, respectively, in order to obtain plane projective transformation coefficients. The pairs (102a, 102b), (103a, 103b), (104a, 104b), (105a, 105b) of the feature points correspond to the same points on the object 101, respectively. The corners of the object 101 corresponding to the pairs (102a, 102b) and (103a, 103b) of the feature points among the pairs are positioned on the front side. The corners of the object 101 corresponding to the pairs (104a, 104b) and (105a, 105b) of the feature points among the pairs are positioned on the back side. Accordingly, assuming that each of the feature points on the first picture 100 is a reference point, the feature points 102b and 103b corresponding to the corners on the front side are transferred in the left direction more than the feature points 104b and 105b corresponding to the corners on the back side, in the second picture 110. In the pictures, the pairs (104a, 104b) and (105a, 105b) of the feature points are positioned on the upper side of the pairs (102a, 102b) and (103a, 103b) of the feature points. As a result, plane projective transformation for minimizing positional difference of the feature points between the two pictures 100 and 110 includes rotational transfer components of rotating the picture clockwise.

Figure 1B:
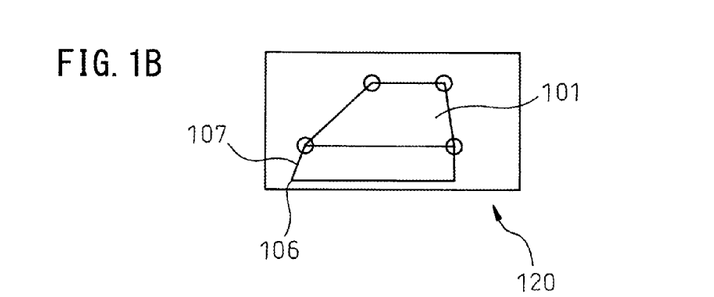
FIG. 1B illustrates an example of a transformed picture obtained by transforming one of the two pictures illustrated in FIG. 1A by using plane projective transformation coefficients calculated by the conventional technique.

FIG. 1B illustrates a transformed picture 120 obtained by performing the plane projective transformation on the first picture 100 illustrated in FIG. 1A, with the plane projective transformation determined by the conventional technique. Although the optical axes of the cameras at the two positions are in parallel, the plane projective transformation includes the rotational transfer components, as for the transformed picture 120. Accordingly, the more distant the position on the picture is from the center of the rotation, the more improper the rotation performed on the position on the picture becomes. As a result, for example, in the transformed picture 120, a lower corner 106 on the left front side in the object 101 is transferred to a position displaced to the left side from a correct position, so that an edge 107 on the left front side in the object 101 is directed in an oblique direction, the edge 107 being directed originally in a vertical direction. Thus, when the plane projective transformation includes the rotational transfer components larger than a rotational amount of a direction of the camera at one of the positions that is a relative rotational amount to a direction of the camera at the other of the positions, the picture transformed by using the plane projective transformation coefficients may contain conspicuous distortion.

In view of above, in order to generate a stereo picture, a stereo picture generating device according to one embodiment obtains plane projective transformation coefficients for performing plane projective transformation on at least one of two pictures of an object photographed from different positions. The stereo picture generating device determines plane projective transforming coefficients such that the plane projective transforming coefficients include only coefficients representing rotational transfer components and translation components, and rotational amounts represented by the rotational transfer components are equal to or smaller than a relative rotational amount between an optical axis of a camera at one of photographing positions and an optical axis of a camera at the other of photographing positions. Thereby, the stereo picture generating device suppresses picture distortion caused by plane projective transformation.

Figure 2:
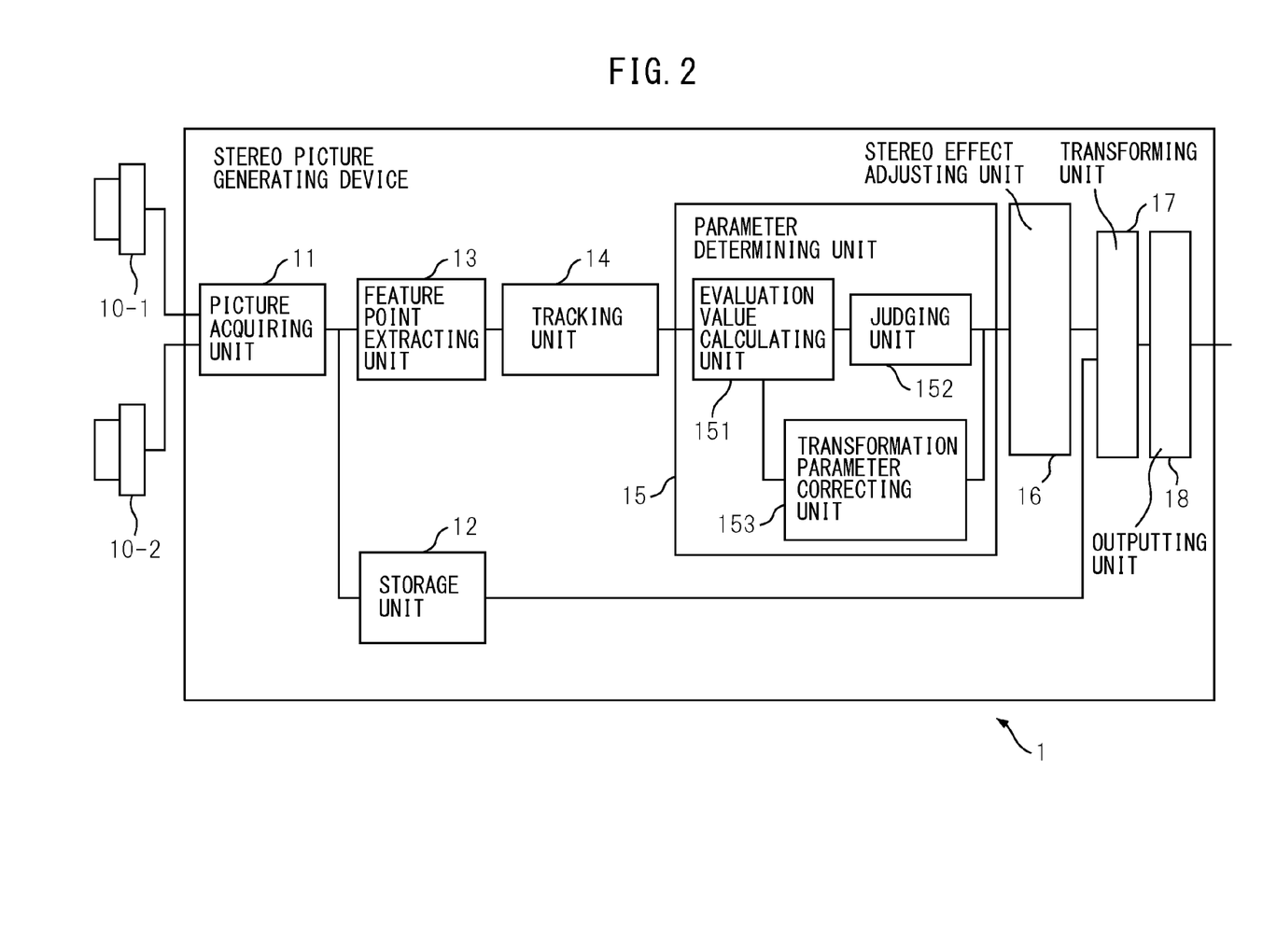
FIG. 2 schematically illustrates a configuration of a stereo picture generating device according to one embodiment.

FIG. 2 illustrates a schematic configuration of the stereo picture generating device according to one embodiment. The stereo picture generating device 1 includes a picture acquiring unit 11, a storage unit 12, a feature point extracting unit 13, a tracking unit 14, a parameter determining unit 15, a stereo effect adjusting unit 16, a transforming unit 17, and an outputting unit 18.

The respective units of the stereo picture generating device 1 are configured as different circuits, respectively. Alternatively, the respective units of the stereo picture generating device 1 may be configured as one integrated circuit into which circuits corresponding to respective units are integrated, and provided in the stereo picture generating device 1. Further, the stereo picture generating device 1 may include one or more processors and memory circuits. In this case, the feature point extracting unit 13, the tracking unit 14, the parameter determining unit 15, the stereo effect adjusting unit 16, and the transforming unit 17 may be functional modules embodied by a computer program that is executed by the processor provided in the stereo picture generating device 1.

The picture acquiring unit 11 obtains pictures of the same object that are photographed from a camera 10-1 located at a first position and from a camera 10-2 located at a second position different from the first position, respectively. For this purpose, for example, the picture acquiring unit 11 includes an interface circuit for connecting the stereo picture generating device 1 with the cameras 10-1 and 10-2, the interface circuit complying with a serial bus standard such as a Universal Serial Bus (USB). Alternatively, the picture acquiring unit 11 may include an interface circuit for connecting the stereo picture generating device 1 via a communication network with another device such as a server storing the two pictures generated by the cameras 10-1 and 10-2.

The picture acquiring unit 11 stores the two obtained pictures in the storage unit 12. Further, the picture acquiring unit 11 outputs the picture obtained from the camera 10-1 among the two obtained pictures to feature point extracting unit 13. Meanwhile, the picture acquiring unit 11 outputs the picture obtained from the camera 10-2 to the tracking unit 14. In the following, for convenience, the picture generated by the camera 10-1 is referred to as a first picture, and the picture generated by the camera 10-2 is referred to as a second picture.

The storage unit 12 includes a volatile or nonvolatile semiconductor memory circuit that is readable and writable, a magnetic recording medium, or an optical recording medium, for example. The storage unit 12 stores the first and second pictures received from the picture acquiring unit 11. Further, the storage unit 12 may store the computer program when at least one of the units provided in the stereo picture generating device 1 is embodied by the computer program executed by the processor provided in the stereo picture generating device 1.

The feature point extracting unit 13 extracts, from the first picture, a point captured on the picture and having a characteristic of the picture as a feature point. For example, the feature point extracting unit 13 performs a filtering process on the first picture by using a corner detecting filter such as the Harris operator or the Foerstner operator to extract a point having a characteristic of a corner shape as the feature point. When the first picture is a color picture, the feature point extracting unit 13 may convert values of pixels of the first picture into values of the HSV color coordinate system to perform the filtering process on the pixel values representing brightness.

Alternatively, the feature point extracting unit 13 may extract as a feature point a point having a different characteristic such as a pixel having a value that is larger or smaller than values of the surrounding pixels, by performing template matching between the first picture and a template corresponding to such a feature point.

The feature point extracting unit 13 generates information representing a plurality of feature points for each picture. The information representing a plurality of feature points includes a position coordinate of each feature point, for example. Alternatively, the information representing a plurality of feature points may include a property of each feature point such as a pixel value of the feature point and a direction of the corner. The feature point extracting unit 13 outputs the information to the tracking unit 14.

The tracking unit 14 calculates coordinates of each feature point on the second picture corresponding to each of the plurality of feature points based on the plurality of feature points on the first picture and the second picture obtained by photographing the object from the second position different from the first point. Each of the plurality of feature points on the first picture and the corresponding feature point on the second picture correspond a same point on the object. The tracking unit 14 obtains at least one pair of the corresponding feature points as described above.

In the present embodiment, the tracking unit 14 uses a tracking technique such as the Kanade Lucas Tomasi Tracker (KLT) method to specify the point on the second picture corresponding to the target feature point on the first picture. Thereby, the tracking unit 14 obtains the pair of the corresponding feature points. Alternatively, the tracking unit 14 may use one of known various tracking methods such as a gradient method and a block matching method to obtain the pair of the corresponding feature points. At the time of using the tracking method, under the condition that the points have a similar property, the tracking unit 14 may obtain the pair of these points as the pair of the corresponding feature points.

For each of the pairs of the corresponding feature points, the tracking unit 14 generates corresponding feature point information including an identifier, and information of the positions of the two feature points included in the pair of the corresponding feature points and the like. The tracking unit 14 outputs the corresponding feature point information to the parameter determining unit 15.

The parameter determining unit 15 calculates plane projective transformation coefficients for performing plane projective transformation on one of the two pictures such that the images of the same object captured on the respective pictures match each other. For this purpose, the parameter determining unit 15 includes an evaluation value calculating unit 151, a judging unit 152, and a transformation parameter correcting unit 153.

In the present embodiment, the stereo picture generating device 1 performs the plane projective transformation on the first picture such that the image of the object captured on the first picture matches the image of the object captured on the second picture.

The plane projective transformation generally includes rotational transfer components, translation components, and shear components. However, when the pictures of the same object are photographed from the two different positions, the relative displacement between the cameras at the two positions includes only the rotational transfer components, and the translation components. Accordingly, in order that the image of the first picture and the image of the second picture for the same object approximately match each other, it suffices that the parameter determining unit 15 takes only the rotational transfer components and the translation components of the plane projective transformation, into consideration. For this reason, according to the present embodiment, the plane projective transformation is performed on the first picture by the following equation.

$$p'_1 = H \cdot p_1 \quad (1)$$
$$= N \cdot h(\theta_x, \theta_x, \theta_x, t_x, t_y, t_z) \cdot N^{-1} \cdot p_1$$
$$= N(R_x(\theta_x) \cdot R_y(\theta_y) \cdot R_z(\theta_z) + T(t_x, t_y, t_z))N^{-1} \cdot p_1$$

In this equation, the symbol $p_l$ indicates a vector representing coordinates of each pixel on the first picture. The vector $p_l$ is represented by the expression $p_1 = (x, y, 1)^t$ when a horizontal coordinate is indicated by the symbol x, and a vertical coordinate is indicated by the symbol y. The symbol $p'_l$ indicates a vector representing coordinates of each pixel on the first picture after the plane projective transformation. The vector $p'_l$ is represented by the expression $p'_l = (x', y', 1)^t$ when a horizontal coordinate is indicated by the symbol x', and a vertical coordinate is indicated by the symbol y'. The symbols $R_x(\theta_x)$, $R_y(\theta_y)$, and $R_z(\theta_z)$ indicate matrixes representing the rotational transfer components, centers of the rotational transfer being the x axis, the y axis, and the z axis respectively, when the optical axis of the camera 10-1 is in the z axis direction, and the x axis and the y axis are a horizontal axis and a vertical axis, respectively that are included in a plane perpendicular to the optical axis z. The matrixes $R_x(\theta_x)$, $R_y(\theta_y)$, and $R_z(\theta_z)$ are expressed by the following equations.

$$R_x(\theta_x) = \begin{pmatrix} 1 & 0 & 0 \\ 0 & \cos\theta_x & \sin\theta_x \\ 0 & -\sin\theta_x & \cos\theta_x \end{pmatrix} \quad (2)$$

$$R_y(\theta_y) = \begin{pmatrix} \cos\theta_y & 0 & \sin\theta_y \\ 0 & 1 & 0 \\ -\sin\theta_y & 0 & \cos\theta_y \end{pmatrix}$$

$$R_z(\theta_z) = \begin{pmatrix} \cos\theta_z & \sin\theta_z & 0 \\ -\sin\theta_z & \cos\theta_z & 0 \\ 0 & 0 & 1 \end{pmatrix}$$

The symbols $\theta_x$, $\theta_y$, $\theta_z$ respectively indicate the plane projective transformation coefficients representing the rotational transfer components, centers of the rotational transfer being the x axis, the y axis, and the z axis, respectively.

The symbol $T(t_x, t_y, t_z)$ indicates the translation matrix representing the translation components, and is expressed by the following equation.

$$T(t_x, t_y, t_z) = \begin{pmatrix} 0 & 0 & t_x \\ 0 & 0 & t_y \\ 0 & 0 & t_z \end{pmatrix} \quad (3)$$

The symbols $t_x$, $t_y$, and $t_z$ respectively indicate the plane projective transformation components representing the translation components along the x axis, the Y axis, and the z axis.

Further, the symbol N indicates an internal parameter matrix representing a property of the camera 10-1, and the symbol $N^{-1}$ indicates an inverse matrix of the internal parameter matrix N. The internal parameter matrix N is expressed by the following equation, for example.

$$N = \begin{pmatrix} f & 0 & c_x \\ 0 & f & c_y \\ 0 & 0 & 1 \end{pmatrix} \quad (4)$$

In this equation, the symbol f indicates a focal length of the camera 10-1, the symbol $C_x$ and $C_y$ indicate the horizontal coordinate and the vertical coordinate in the first picture that correspond to the point on the optical axis. When the focal length of the camera 10-1 is not known, a focal length of a camera having a generally often used field angle is used as the focal length f. When an aspect ratio of a height and a width of pixels of a picture sensor provided in the camera 10-1 is not a ratio of 1:1, the internal parameter matrix may be expressed by the following equation, for example.

$$N = \begin{pmatrix} f_x & 0 & c_x \\ 0 & f_y & c_y \\ 0 & 0 & 1 \end{pmatrix} \quad (5)$$

In this equation, the focal lengths $f_x$ and $f_y$ may be set as $f_x=f/W$ and $f_y=f/H$, respectively, the symbol f indicating the focal length of imaging optical system of the camera 10-1, the symbol W indicating the width of the pixels and the symbol H indicating the height of the pixels.

When ideal plane projective transformation coefficients have been obtained, performing the plane projective transformation on each of the feature points extracted from the first picture in accordance with the equation (1) causes each of the feature points to be transformed into a position on the second picture that corresponds to the feature point on the first picture. In view of above, when the evaluation value calculating unit 151 performs the plane projective transformation on each of the feature points extracted from the first picture, in accordance with the equation (1), the parameter determining unit 15 calculates an evaluation value including distance between each after-transformation feature point and the point that is extracted from the second picture and that corresponds to the after-transformation feature point.

Further, in the present embodiment, in order to suppress the rotational transfer components, the evaluation value includes a weighting term. The more the rotational transfer components increase, the more a value of the weighting term increases. The value of the weighting term is smaller than a displacement amount by which the feature point is transferred by the rotational transfer components. The parameter determining unit 15 obtains the plane projective transformation coefficients that minimize the above-described evaluation value.

In the present embodiment, the evaluation value C is expressed by the following equation.

$$C = \sum_{i=1}^{N} \{\|v'_i - h(\theta_x, \theta_y, \theta_z, t_x, t_y, t_z) \cdot v_i\|^2 + w(v_i, v'_i, \theta_x, \theta_y, \theta_z)\} \quad (6)$$

In this equation, the symbol $v_i$ (i=1, 2, ..., N) represents the feature point extracted from the first picture, and the symbol $v'_i$ (i=1, 2, ..., N) represents the point on the second picture corresponding to the feature point vi. The symbol N is an integer equal to or larger than one, and represents the number of pairs of the corresponding feature points. Norm $\|\alpha-\beta\|$ represents a distance between two points $\alpha=(\alpha_x, \alpha_y, 1)$ and $\beta=(\beta_x, \beta_y, 1)$. For example, the equation $\|\alpha-\beta\|=\{(\alpha_x-\beta_x)^2+(\alpha_y-\beta_y)^2\}^{1/2}$ is satisfied. The symbol $w(v_i, v'_i, \theta_x, \theta_y, \theta_z)$ indicates the weighting term that increases in accordance with the rotational transfer components. The first term of the right side in the equation (6) may be the sum of the absolute values of the difference between the point $v'_i$ and the point $h(\theta_x, \theta_y, \theta_z, t_x, t_y, t_z)v_i$.

A setting method of the weighting term $w(v_i, v'_i, \theta_x, \theta_y, \theta_z)$ will be described. When the optical axis of the camera 10-2 is rotated by a rotational angle $-\Theta$ from the optical axis (i.e., z axis) of the camera 10-1, the feature point $v_i$ on the first picture is estimated to be rotationally transferred to the position on the second picture represented by the following equation, on the basis of the equation (1).

$$N \cdot h(0,0,\Theta,0,0,0) \cdot N^{-1} \cdot v_i \quad (7)$$

In such rotational transfer, when a circle radius from a rotational center to the feature point $v_i$ is $r_i$, and a rotational angle is $\Theta$, a transfer amount of the feature point along the chord is $2r_i*\sin(\Theta/2)$. The point on the optical axis is generally positioned at a center of the picture. Accordingly, the circle radius $r_i$ of the rotational transfer is a length from the center of the picture to the feature point $v_i$.

For this reason, a difference between a square of a first length and a square of a second length is expressed by the following equation, the first length being a length between the feature point $v_i$ on the first picture and the corresponding point $v'_i$ on the second picture, the second length being a length between the point rotated from the feature point $v_i$ centering the z axis by the angle $\Theta$ and the point $v'_i$.

$$\|v'_i - v_i\|^2 - \|v'_i - h(0,0,\Theta,0,0,0) \cdot v_i\|^2 = \{2r_i \sin(\Theta/2)\}^2 + \epsilon_i \quad (8)$$

In this equation, the symbol $\epsilon_i$ indicates an error caused by deviation of the extracted feature point, or distortion aberration, for example.

When the optical axis of the camera 10-2 is rotated from the optical axis of the camera 10-1 by the angle $-\Theta$, the equation (8) is established for all of the pairs of the corresponding points. Accordingly, the following equation is established.

$$\sum_{i=1}^{N} \|v'_i - v_i\|^2 - \sum_{i=1}^{N} \|v'_i - h(0, 0, \Theta, 0, 0, 0) \cdot v_i\|^2 = \left\{\sum_{i=1}^{N} 2r_i \cdot \sin(\Theta/2)\right\}^2 + \sum_{i=1}^{N} \epsilon_i \quad (9)$$

In this equation, when the error term $\Sigma \epsilon_i$ is sufficiently small, the following condition is assumed from the equation (9).

$$\sum_{i=1}^{N} \|v'_i - v_i\|^2 - \sum_{i=1}^{N} \|v'_i - h(0, 0, \Theta, 0, 0, 0) \cdot v_i\|^2 > \left\{\alpha \sum_{i=1}^{N} 2r_i \cdot \sin(\Theta/2)\right\}^2 \quad (10)$$

$$\Leftrightarrow \sum_{i=1}^{N} \|v'_i - v_i\|^2 > \sum_{i=1}^{N} \|v'_i - h(0, 0, \Theta, 0, 0,) \cdot v_i\|^2 + \left\{\alpha \sum_{i=1}^{N} 2r_i \cdot \sin(\Theta/2)\right\}^2 \quad (10)'$$

The coefficient α has a value satisfying the inequality 0<α<1.

The left side of the equation (10') corresponds to the first term in the right side of the equation (6) for calculating the evaluation value C when the rotational transfer amount and the translation amount are zero (i.e. h(0, 0, 0, 0, 0, 0)). Accordingly, the equation (10)' represents that the total of the sum of squares of the lengths between the corresponding feature points, and the sum of the values obtained by multiplying the rotational transfer amount of each feature point $v_i$ by the coefficient α becomes small when each feature point $v_i$ is rotated around the z axis. In other words, when the optical axis of the camera 10-2 is rotated around the z axis relative to the optical axis of the camera 10-1, obtaining an appropriate value of Θ causes the right side of the equation (10)' to become smaller than the evaluation value C for the assumption that there are no rotational transfer components and no translation components. Meanwhile, when the transfer of the optical axis of the camera 10-2 relative to the optical axis of the camera 10-1 does not include the rotational transfer component, center of the rotational transfer being the z axis, the relation of the equation (10)' is not established. Accordingly, there is a high possibility that only adjusting the value of Θ does not cause the value of the right side of the equation (10)' to become smaller than the evaluation value C for the assumption that there are no rotational transfer components and no translation components.

Comparing the right side of the equation (10)' with the right side of the equation (6), it is understood that the first term of the right side of the equation (10)' corresponds to the first term of the right side of the equation (6). For this reason, the second term of the right side of the equation (6), i.e., the weighting term can be made to correspond to the second term of the right side of the equation (10)'.

Accordingly, the weighting term is expressed by the following equation, for example, by taking into consideration the weighting term including all of the rotational transfer components.

$$w(v_i, v'_i, \theta_x, \theta_y, \theta_z) = 4r_i^2 \cdot (\alpha_x \cdot \sin(\theta_x/2)^2 + \alpha_y \cdot \sin(\theta_y/2)^2 \alpha_z \sin(\theta_z/2)^2) \quad (11)$$

The symbol $r_i$ indicates a length from the center of the first picture to the feature point $v_i$. The coefficients $\alpha_x$, $\alpha_y$, and $\alpha_z$ are positive real values smaller than one (i.e., $0 < \alpha_x, \alpha_y, \alpha_z < 1$). The coefficients $\alpha_x$, $\alpha_y$, and $\alpha_z$ may be set to be values different from one another. The larger these coefficients are, the larger the weighting term is, the weighting term being attributed to the rotational transfer components of the plane projective transformation corresponding to the coefficients. As a result, the evaluation value C becomes larger, as well. For this reason, the larger these coefficients $\alpha_x$, $\alpha_y$, and $\alpha_z$ are, the more the plane projective transformation coefficients $\theta_x$, $\theta_y$, and $\theta_z$ corresponding to the coefficients $\alpha_x$, $\alpha_y$, and $\alpha_z$ are suppressed. For example, when the camera 10-1 and the camera 10-2 are installed, the optical axes of the cameras are likely to be rotated in the vertical direction. For this reason, the coefficient $\alpha_y$ may be set to be smaller than the other coefficients $\alpha_x$ and $\alpha_z$ such that the rotational components in the vertical direction in the plane projective transformation coefficients become larger.

When the center angle θ between the two points on the circle having a radius r is sufficiently small, a length of the chord connecting the two points can be approximated by rθ. For this reason, when the rotational amount of the optical axis of the camera 10-2 relative to the optical axis of the camera 10-1 is small, the weighting term may be expressed by the following equation.

$$w(v_i, v'_i, \theta_x, \theta_y, \theta_z) = 4r_i^2 \cdot (\alpha_x \cdot \theta_x + \alpha_y \cdot \theta_y + \alpha_z \cdot \theta_z)^2 \quad (12)$$

As in a situation when the cameras 10-1 and 10-2 are equipped with a gyro sensor, there is a situation in which the stereo picture generating device 1 can obtain information concerning the direction of the optical axis of each camera from each camera via the picture acquiring unit 11, for example. In such a situation, the parameter determining unit 15 can calculate a difference between the directions of the optical axes of the respective cameras as an estimated value of the rotational amount of the optical axis of the camera 10-2 relative to the optical axis of the camera 10-1. For this reason, in such a situation, the weighting term may be defined by the following equation using the estimated value of the rotational amount.

$$w(v_i, v'_i, \theta_x, \theta_y, \theta_z) = 4r_i^2 \cdot (\alpha_x \cdot \sin((\theta_x - \theta_{x0})/2)^2 + \alpha_y \cdot \sin((\theta_y - \theta_{y0})/2)^2 + \alpha_z \sin((\theta_z - \theta_{z0})/2)^2) \quad (13)$$

In this equation, $\theta_{x0}$, $\theta_{y0}$, and $\theta_{z0}$ are the estimated values of the rotational amounts of the optical axis of the camera 10-2 relative to the optical axis of the camera 10-1 around the x axis, the y axis, and the z axis, respectively.

The evaluation value calculating unit 151 uses the plane projective transformation coefficients corrected by the transformation parameter correcting unit 153 to calculate the evaluation value C in accordance with the equation (6) until the judging unit 152 described later judges that the estimation value converges.

Alternatively, the evaluation value calculating unit 151 may calculate differential value C' of the evaluation value C, instead of the evaluation value C itself. In this case, the evaluation value calculating unit 151 calculates a first order partial differential value by performing partial differentiation on the right side of the equation (6), for each plane projective transformation coefficient. The evaluation value calculating unit 151 determines as the differential value C' the first order partial differential value of which absolute value is the largest among those of the first order partial differential values of the respective plane projective transformation coefficients.

The evaluation value calculating unit 151 provides to the judging unit 152 the calculated evaluation value C or differential value C' thereof, and the plane projective transformation coefficients used in calculation of the evaluation value C or the like.

The judging unit 152 judges whether or not the evaluation value C or differential value C' thereof calculated by the evaluation value calculating unit 151 satisfies a convergence condition. For example, when the evaluation value C is smaller than a predetermined threshold Thc, the judging unit 152 judges that the evaluation value C satisfies the convergence condition, and that the evaluation value C has been minimized. The predetermined threshold Thc is set to be 0.1, for example.

Alternatively, when the absolute value of the differential value C' of the evaluation value C is smaller than a predetermined threshold Thd, the judging unit 152 judges that the differential value C' satisfies the convergence condition, and that the evaluations value C has been minimized. In this case, the predetermined threshold Thd is set to be 0.000001, for example.

When the evaluation value C or the differential value C' thereof satisfies the convergence condition, the feature point on the first picture on which the plane projective transformation has been performed matches the corresponding feature point on the second picture well, the plane projective transformation being based on the plane projective transformation coefficients used for calculating the evaluation value C or the like. Accordingly, the plane projective transformation coefficients are suitable for the plane projective transformation of the first picture. For this reason, the judging unit 152 outputs the plane projective transformation coefficients to the stereo effect adjusting unit 16.

Meanwhile, when the evaluation value C or the differential value C' thereof does not satisfy the convergence condition, the feature point on the first picture on which the plane projective transformation has been performed does not sufficiently match the corresponding feature point on the second picture well, the plane projective transformation being based on the plane projective transformation coefficients used for calculating the evaluation value C or the like. Accordingly, the judging unit 152 provides to the transformation parameter correcting unit 153 the plane projective transformation coefficients used for calculating the evaluation value C or the like in order to search the plane projective transformation coefficients suitable for the plane projective transformation of the first picture.

When the evaluation value C or the differential value C' thereof does not satisfy the convergence condition, the transformation parameter correcting unit 153 corrects at least one of values of the plane projective transformation coefficients. For example, the transformation parameter correcting unit 153 corrects all of the plane projective transformation coefficients in accordance with the following equation so as to decrease the evaluation value C.

$$q_j = q_j - \gamma \frac{\partial}{\partial q_j} C \qquad (14)$$

$$q_j \in \{\theta_x, \theta_y, \theta_z, t_x, t_y, t_z\}$$

In this equation, the partial differential of C with respect to $q_j$, is calculated by performing partial differential on the right of the equation (6) for the plane projective transformation coefficient $q_j$. The coefficient $\gamma$ is set to be 0.2, for example. The value of the partial differential of C with respect to $q_j$ may be calculated by numerical operation.

The transformation parameter correcting unit 153 may correct only one of the coefficients in one time of correction. In this case, for example, the transformation parameter correcting unit 153 may correct only the plane projective transformation coefficient of the partial differential term of the evaluation value C, the absolute value of the partial differential term being the largest among those in the equation (14). Alternatively, the transformation parameter correcting unit 153 may correct the respective plane projective transformation coefficients one by one in the predetermined order.

The transformation parameter correcting unit 153 provides the corrected plane projective transformation coefficients to the evaluation value calculating unit 151.

In this way, the parameter determining unit 15 corrects the plane projective transformation coefficients until the evaluation value C or the differential C' thereof satisfies the convergence condition. Thereby, the parameter determining unit 15 can obtain the plane projective transformation coefficients corresponding to the minimized evaluation value C.

As expressed by the equation (6) and the equations (11) to (13), the equations for calculating the evaluation value C include the weighting term that becomes heavier as the rotational transfer components increase. As a result, the evaluation value C for the plane projective transformation coefficients including a coefficient representing the rotational transfer component that is larger than a relative rotational amount of the optical axes of the two cameras is not minimized. Meanwhile, the value of the weighting term is smaller than the transfer amounts of the feature point attributed to the rotational transfer components. For this reason, a decreased amount of the value of the first term in the right side of the equation (6) is larger than an increased amount of the weighting term, the decreased amount being attributed to decrease in difference between the rotational transfer components due to the plane projective transformation and the relative rotational amounts of the optical axes of the two cameras. Accordingly, minimizing the evaluation value C causes the rotational transfer components due to the plane projective transformation to become approximately equal to the relative rotational amount of the optical axes of the two cameras. For this reason, the parameter determining unit 15 can minimize the evaluation value C to obtain appropriate plane projective transformation coefficients.

The parameter determining unit 15 may use a global optimization method such as a simulated annealing and genetic algorithm to obtain the plane projective transformation coefficients that minimize the evaluation value. In addition, in this case, the evaluation value is set so as to include the weighting term expressed in the equations (11) to (13).

The stereo effect adjusting unit 16 corrects the plane projective transformation coefficients so as to give the two pictures a parallax depending on a desired position in the front-to-back direction at which the image in the stereo picture is reproduced, the stereo picture being created on the basis of the two pictures obtained via the picture acquiring unit 11. For example, in a three-dimensional display using a parallax of both eyes, an image captured on a picture for the right eye, and an image captured on a picture for the left eye are created such that the viewable directions of the images are shifted from each other by the parallax that exists when the image is positioned at a predetermined distance from the viewer. Since the right and left eyes of a human are separated in the horizontal direction, the parallax may include only a component in the horizontal direction.

Therefore, in accordance with the parallax, the stereo effect adjusting unit 16 corrects the coefficient $t_x$ representing a translation amount in the horizontal direction, among the plane projective transformation coefficients received from the parameter determining unit 15. In an example, the parallax is set in advance to be stored in the storage unit 12. Alternatively, the stereo picture generating device 1 may obtain the parallax via a user interface such as a keyboard which is not illustrated.

Figure 3:
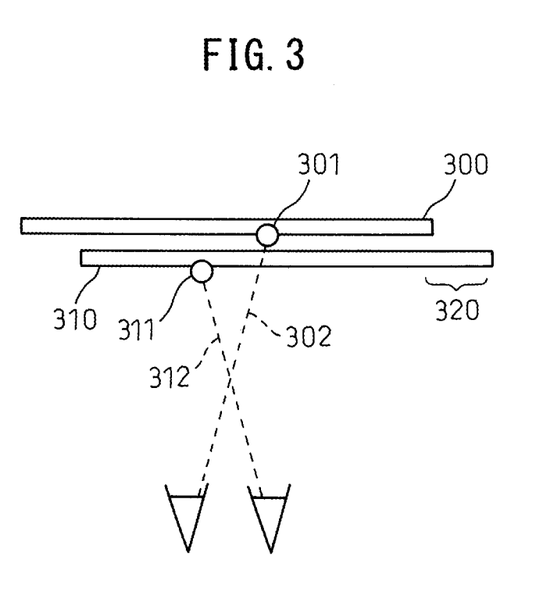
FIG. 3 illustrates a relationship between a parallax which is set for two pictures and a reproduced position of an image on the two pictures in the front-to-back direction.

FIG. 3 illustrates a relationship between a parallax set for two pictures and a reproducing position of an image on the two pictures in the front-to-back direction. The picture 300 is a picture for a left eye, and is created by performing the plane projective transformation on the first picture generated by the camera 10-1, for example. Meanwhile, the picture 310 is a picture for a right eye, and is the second picture itself generated by the camera 10-2, for example. A point 301 on the picture 300 and a point 311 on the picture 310 represent the same point on the image of the same object. In this case, a three-dimensional image formed by the point 301 and the point 311 is reproduced at a position where a sight line 302 connecting the point 301 and the left eye of the viewer intersects with a sight line 312 connecting the point 311 and the right eye of the viewer.

Accordingly, the more the point 301 transfers to the right side relative to the point 311, the nearer to the viewer the three-dimensional image formed by the point 301 and the point 311 is reproduced. Conversely, the smaller a length between the point 311 and the point 301 becomes, the nearer to a display displaying the pictures 300 and 310 the three-dimensional image formed by the point 301 and the point 311 is reproduced. When the sight line 302 and the sight line 312 intersect each other at a position more distant than the display displaying the pictures 300 and 310, three-dimensional image formed by the point 301 and the point 311 is reproduced at a position on the more back side than the display.

For this reason, the stereo effect adjusting unit 16 makes a first ratio equal to a second ratio, the first ratio being a ratio of a distance from the viewer to the position where the three-dimensional image is reproduced to a distance between the left and right eyes of an ordinary person, the second ratio being a ratio of a distance from the display to the position where the three-dimensional image is reproduced to a distance between the points that are on the two pictures and that correspond to the same object. In order to satisfy this condition, the stereo effect adjusting unit 16 sets a transfer amount $S_x$ in the horizontal direction corresponding to the parallax. Then, the stereo effect adjusting unit 16 uses the equation (1) to calculate a matrix H of 3×3 from the parameters obtained by the parameter determining unit 15, the rotational matrix R, and the translation matrix T, and correct an element of each line of the 1 column to be $h_{1j}=h_{1j}+s_x*h_{3j}$, in which an element of the i column and j line is represented by $h_{ij}$.

The stereo effect adjusting unit 16 outputs to the transforming unit 17 the plane projective transformation coefficients corrected in accordance with the parallax.

When the parallax exists, like a region 320 in FIG. 3, for example, there is a region existing only in the picture for either one of the eyes. The stereo effect adjusting unit 16 may specify a range of such a region in accordance with the parallax. The stereo effect adjusting unit 16 outputs information of the specified range of the region to the transforming unit 17.

The transforming unit 17 uses the obtained plane projective transformation coefficients to perform the plane projective transformation on the one of the pictures. Thereby, the transforming unit 17 creates a stereo picture. In the present embodiment, the plane projective transformation coefficients for the first picture generated by the camera 10-1 are obtained. Accordingly, the transforming unit 17 reads the first picture from the storage unit 12 to perform the plane projective transformation on each pixel of the first picture by using the plane projective transformation coefficients. When coordinate values of the pixel that has been plane-projective-transformed include a value that is not an integer, for example, the transforming unit 17 performs linear interpolation for each pixel of the transformed picture by using values of the transformed pixels around the pixel, to obtain a value of each of the after-transformation pixels.

When the transforming unit 17 receives from the stereo effect adjusting unit 16 the information of the range of the region of which image is projected to only one eye, the transforming unit 17 may set a value of each pixel in the range to be zero.

The transforming unit 17 outputs a pair of the plane-projective-transformed first picture and the second picture read from the storage unit 12, as the stereo picture, to the outputting unit 18.

The outputting unit 18 includes an interface circuit for connecting the stereo picture generating device 1 with other devices, for example. The outputting unit 18 may add header information of a predetermined format to the stereo picture. The header information includes information such as the parallax and a size of the first and second pictures. The outputting unit 18 outputs the created stereo picture to other devices.

Figure 4:
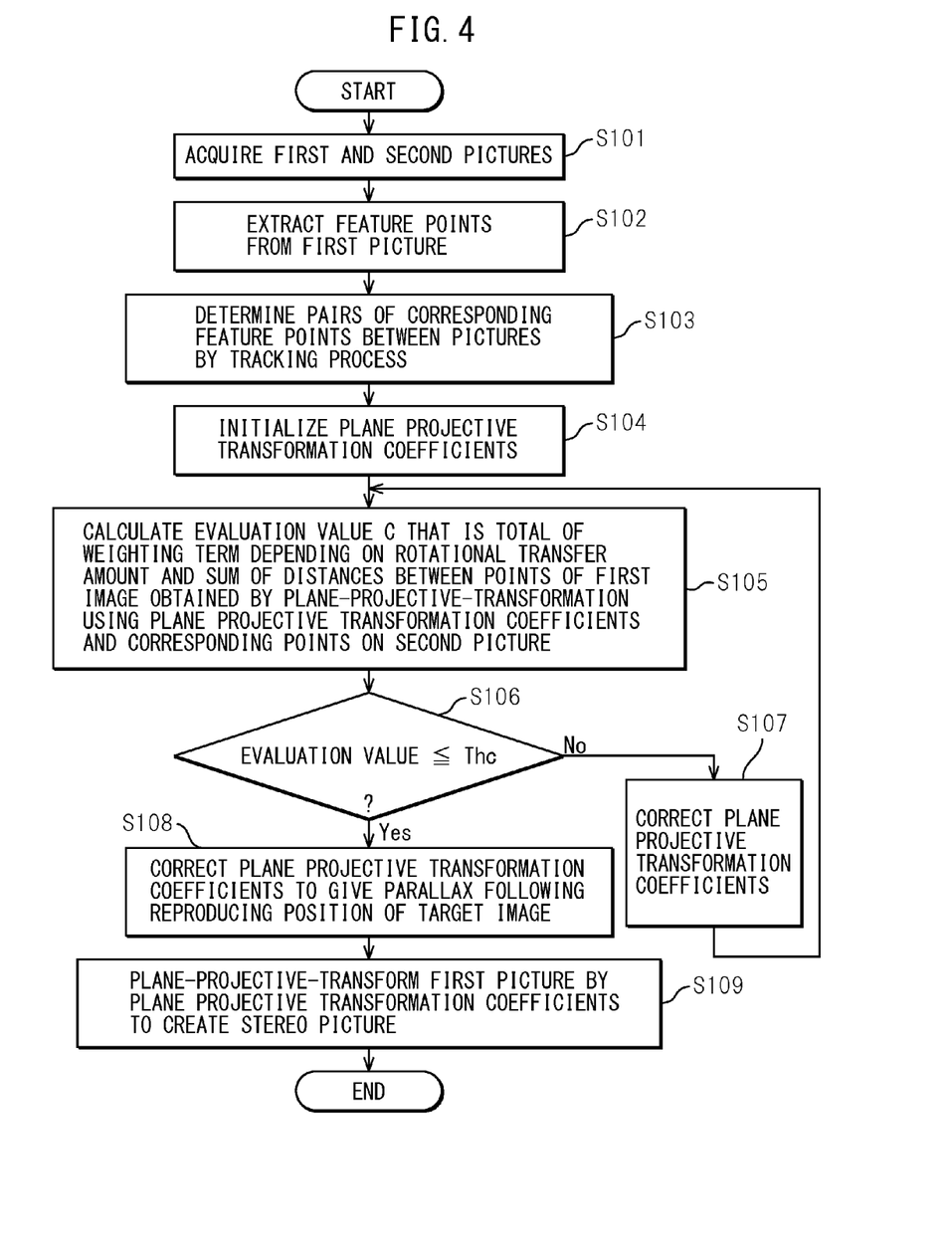
FIG. 4 is an operation flowchart of a stereo picture generating process.

FIG. 4 is an operation flowchart of a stereo picture generating process.

First, the stereo picture generating device 1 obtains the first picture from the camera 10-1 located at the first position, and the second picture from the camera 10-2 located at the second position different from the first position, via the picture acquiring unit 11 (step S101). Then, the first and second pictures are stored in the storage unit 12. The first picture is transferred to the feature point extracting unit 13. The second picture is transferred to the tracking unit 14.

The feature point extracting unit 13 extracts the feature points from the first picture (step S102). Then, the feature point extracting unit 13 outputs information representing the feature points of the picture to the tracking unit 14.

The tracking unit 14 uses the tracking technique to determine the pairs of the corresponding feature points respectively included in the first picture and the second picture (step S103). Then, the tracking unit 14 outputs information representing the pairs of the corresponding feature points to the parameter determining unit 15.

The parameter determining unit 15 initializes the plane projective transformation coefficients (step S104). For example, the initialization causes the respective coefficients $\theta_x$, $\theta_y$, $\theta_z$, $t_x$, $t_y$, $t_z$ to be zero. Then, the parameter determining unit 15 transfers the initialized plane projective transformation coefficients to the evaluation value calculating unit 151 of the parameter determining unit 15.

The evaluation value calculating unit 151 calculates the evaluation value C that is the sum of the weighting term depending on the rotational transfer amounts, and the total of distances, each of the distances being a distance between the position obtained by plane-projective-transforming each feature point on the first picture by using the plane projective transformation coefficients, and the position of the corresponding feature point on the second picture (step S105). Then, the evaluation value calculating unit 151 transfers the evaluation value C and the plane projective transformation coefficients used in calculating the evaluation value C, to the judging unit 152 of the parameter determining unit 15.

The judging unit 152 judges whether or not the evaluation value C is smaller than the predetermined threshold Thc (step S106).

When the evaluation value C is equal to or larger than the predetermined threshold Thc (No at step S106), the judging unit 152 transfers the plane projective transformation coefficients used in calculating the evaluation value C, to the transformation parameter correcting unit 153. The transformation parameter correcting unit 153 corrects the plane projective transformation coefficients (step S107). Then, the transformation parameter correcting unit 153 transfers the corrected plane projective transformation coefficients used in calculating the evaluation value C, to the evaluation value calculating unit 151. Thereafter, the parameter determining unit 15 repeats the process of the step S105 and the processes after the step S105.

Meanwhile, when the evaluation value C is smaller than the predetermined threshold Thc, i.e., when the evaluation value C satisfies the convergence condition (Yes at step S106), the judging unit 152 judges that the evaluation value C has been minimized. Accordingly, the judging unit 152 outputs the plane projective transformation coefficients used in calculating the evaluation value C, to the stereo effect adjusting unit 16. Then, the stereo effect adjusting unit 16 corrects the plane projective transformation coefficients so as to provide the parallax depending on a reproducing position of a target image (step S108). The stereo effect adjusting unit 16 outputs the corrected plane projective transformation coefficients to the transforming unit 17.

The transforming unit 17 reads the first and second pictures from the storage unit 12. Then, the transforming unit 17 uses the plane projective transformation coefficients received from the stereo effect adjusting unit 16 to plane-projective-transform the first picture. Thereby, the transforming unit 17 creates a stereo picture (step S109). Then, the transforming unit 17 outputs the stereo picture to other devices via the outputting unit 18. Then, the stereo picture generating device 1 terminates the stereo picture generating process.

At the step S105, the evaluation value calculating unit 151 may calculate the differential value C' of the evaluation value C, as described above. In this case, at the step S106, when an absolute value of the differential value C' is smaller than the predetermined threshold Thd for the differential value of the evaluation value, the judging unit 152 judges that the differential value C' satisfies the convergence condition, and that the evaluation value C has been minimized.

As described above, the stereo picture generating device limits the plane projective transformation coefficients to the coefficients representing the rotational transfer components assumed as actual movement of the cameras, and the coefficients representing the translation components. Further, the stereo picture generating device obtains each of the plane projective transformation coefficients so as to minimize the evaluation value including the displacement amount between the feature points that have been extracted from the one of the pictures and that have been plane-projective-transformed, and the corresponding points extracted from the second picture, and including the weighting term that increases in accordance with the rotational transfer components. As a result, when the plane projective transformation coefficients include a coefficient corresponding to the rotational transfer component larger than an actual relative rotational amount between the optical axes of the two cameras, the evaluation value becomes relatively large, and is not minimized. For this reason, the stereo picture generating device can prevent the plane projective transformation coefficients including the rotational transfer component larger than the actual relative rotational amount between the optical axes, from being obtained. Accordingly, the stereo picture generating device can create a stereo picture in which an image is less distorted.

The present invention is not limited to the above-described embodiment. For example, according to another embodiment, the stereo picture generating device may plane-projective-transform the second picture such that an image of an object captured on the second picture matches an image of the object captured on the first picture. In this case, the stereo picture generating device obtains the plane projective transformation coefficients for the second picture.

The feature point extracting unit may extract the feature points from the second picture. In this case, the tracking unit detects the points on the first picture corresponding to the feature points extracted from the second picture.

In addition, the stereo picture generating device may receive a moving picture from each of the cameras to create a stereo picture for each frame. In this case, even if both of the cameras do not move, when the plane projective transformation coefficients are changed, a reproducing position of a three-dimensional image fluctuates in the time axis direction. As a result, the reproduced image undesirably appears to be wavering. In view of above, when the stereo picture generating device receives a first frame from each of the cameras, and when at least one of the cameras moves, the stereo picture generating device creates the plane projective transformation coefficients.

Figure 5:
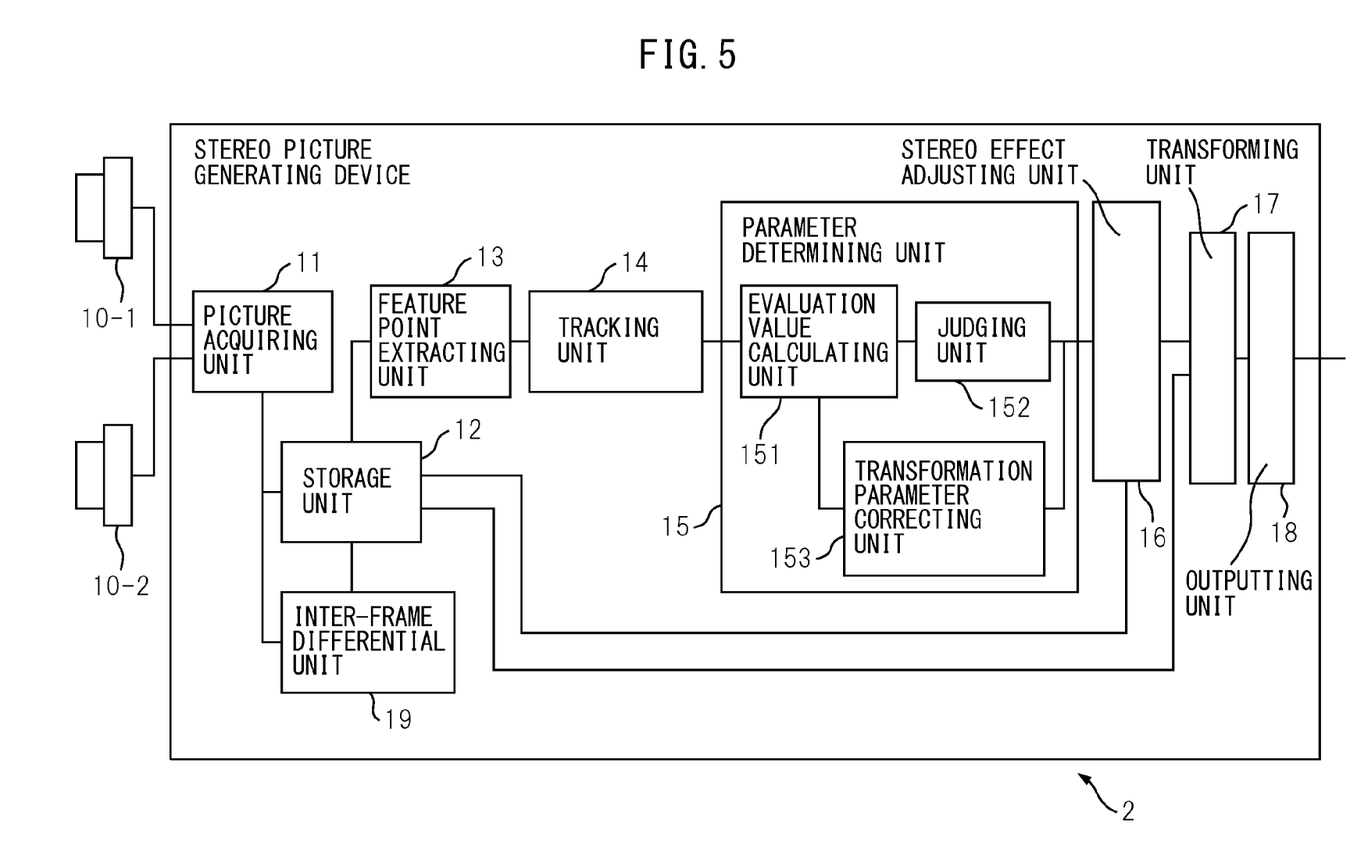
FIG. 5 schematically illustrates a configuration of a stereo picture generating device according to another embodiment.

FIG. 5 schematically illustrates a configuration of the stereo picture generating device according to this modification.

The stereo picture generating device 2 according to the modification includes the picture acquiring unit 11, the storage unit 12, the feature point extracting unit 13, the tracking unit 14, the parameter determining unit 15, the stereo effect adjusting unit 16, the transforming unit 17, the outputting unit 18, and an inter-frame differential unit 19.

In FIG. 5, the same reference numerals of the corresponding constituting elements of the stereo picture generating device 1 of FIG. 2 are given to the respective units of the stereo picture generating device 2.

The stereo picture generating device 2 differs from the above-described stereo picture generating device 1 in that the stereo picture generating device 2 includes the inter-frame differential unit 19. For this reason, in the following, the matters concerning the inter-frame differential unit 19 will be described. For the other elements, refer to the related description in the above-described embodiment.

When the stereo picture generating device 2 receives first frame from each of the cameras, the stereo picture generating device 2 calculates the plane projective transformation coefficients. Then, the stereo picture generating device 2 stores the plane projective transformation coefficients in the storage unit 12.

Each time the stereo picture generating device 2 receives a frame from each of the cameras, the stereo picture generating device 2 temporarily stores the frames in the storage unit 12. The storage unit 12 stores the several latest frames for the moving picture of each of the cameras.

The inter-frame differential unit 19 examines change between a pixel value of the latest frame and a pixel value of the frame directly before the latest frame, for each moving picture to determine whether or not the camera moved. For this purpose, the inter-frame differential unit 19 performs inter-frame differential calculation between the latest frame and the frame directly before the latest frame to obtain a differential value representing change of a pixel value in the time direction, for each pixel. When a ratio of the number of the pixels for which an absolute value of the differential value is equal to or larger than a predetermined threshold reaches a predetermined ratio to the number of pixels of the entire picture, the inter-frame differential unit 19 judges that the camera moved. In one example, the threshold for the absolute value of the differential value is set to be a value from approximately one-fourth to approximately a half of a range of a value that the pixel can take. In one example, the predetermined ratio is set to be a value from approximately 40% to approximately 70%.

When the inter-frame differential unit 19 judges that one of the cameras moved, the stereo picture generating device 2 calculates new plane projective transformation coefficients, and updates the plane projective transformation coefficients stored in the storage unit 12 to be the new calculated plane projective transformation coefficients. Then, the transforming unit 17 uses the new calculated plane projective transformation coefficients to plane-projective-transform the frame of one of the cameras. Thereby, the transforming unit 17 generates a stereo picture.

Meanwhile, when the inter-frame differential unit 19 judges that none of the cameras moved, the transforming unit 17 uses the plane projective transformation coefficients that are stored in the storage unit 12 and that were created in the past to plane-projective-transform the frame of one of the cameras. Thereby, the transforming unit 17 generates a stereo picture. In this case, the processes of the feature point extracting unit 13, the tracking unit 14, the parameter determining unit 15, the stereo effect adjusting unit 16 are omitted.

According to another modification, the stereo picture generating device may generate a stereo picture on the basis of two pictures received from one camera. In this case, when the one camera at a first position photographs a picture of an object to create a first picture, the stereo picture generating device receives the first picture via the picture acquiring unit to store the first picture in the storage unit. Then, the camera moves to a second position. When the camera at the second position photographs a picture of the object to create a second picture, the stereo picture generating device receives the second picture via the picture acquiring unit.

When the stereo picture generating device receives both of the first and second pictures, the stereo picture generating device obtains the plane projective transformation coefficients in accordance with the above-described embodiment. Then, the stereo picture generating device uses the plane projective transformation coefficients to plane-projective-transform either one of the first and second pictures. Thereby, the stereo picture generating device creates a stereo picture.

As in a situation when a distance between the first position and the second position is large, there is a situation in which a specific point of an object on the first picture is largely separated from the specific point on the second picture. In such a situation, it may be difficult to accurately obtain the pairs of the corresponding feature points by the tracking unit. Therefore, the stereo picture generating device may receive a third picture photographed by the camera at one or more positions between the first position and the second position. Subsequently, the feature point extracting unit of the stereo picture generating device extracts the feature points from the first picture. The tracking unit obtains pairs of the feature points corresponding to each other between the first picture and the third picture, and obtains pairs of the feature points corresponding to each other between the third picture and the second picture to specify the feature points that have been extracted from the second picture and that correspond to the feature points extracted from the first picture.

A computer program for causing a computer to implement functions of the feature point extracting unit, the tracking unit, the parameter determining unit, the stereo effect adjusting unit, and the transforming unit provided in the stereo picture generating device may be provided in a state where the computer program is stored in a computer readable medium. The computer readable medium does not include a carrier wave.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relates to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A stereo picture generating device comprising:
   a feature point extracting unit that extracts a plurality of feature points from a first picture generated by photographing an object from a first position;
   a tracking unit that calculates coordinate of each point on a second picture generated by photographing the object from a second position different from the first position corresponding to each of the plurality of feature points, wherein each of the plurality of the feature points and the corresponding point on the second picture correspond to a same point on the object;
   a parameter determining unit that determines plane projective transformation coefficients which include at least one coefficient representing a rotational transfer component and at least one coefficient representing a translation component so as to minimize an evaluation value that includes distance between each of transformed feature points, which are obtained by plane-projective-transforming the feature points on the first picture by using the plane projective transformation coefficients, and the corresponding point on the second picture and a weighting term having a value depending on the rotational transfer component; and
   a transforming unit that plane-projective-transforms the first picture by using the plane projective transformation coefficients, to generate a pair of plane-projective-transformed picture and the second picture as a stereo picture.

2. The stereo picture generating device according to claim 1, wherein the weighting term increases as the rotational transfer component increases, and has a value smaller than transfer amount of each of the feature points on the first picture according to the rotational transfer component.

3. The stereo picture generating device according to claim 2, wherein the rotational transfer component includes a first rotational transfer component for a rotational transfer of which a center is an optical axis of an imaging device that has generated the first picture, a second rotational transfer component for a rotational transfer of which a center is a horizontal axis that is in parallel to a plane perpendicular to the optical axis, and a third rotational transfer component for a rotational transfer of which a center is a vertical axis that is perpendicular to the optical axis and the horizontal axis, and
   the weighting term is expressed by a sum of a product of the first rotational transfer component and a first coefficient, a product of the second rotational transfer component and a second coefficient, and a product of the third rotational transfer component and a third coefficient, and the third coefficient is set to be smaller than the first coefficient and the second coefficient.

4. The stereo picture generating device according to claim 1, wherein the plane projective transformation coefficients include only the coefficient representing the rotational transfer component, and the coefficient of the translation component.

5. A stereo picture generating method comprising:
   extracting a plurality of feature points from a first picture generated by photographing an object from a first position;
   calculating coordinate of each point on a second picture generated by photographing the object from a second position different from the first position corresponding to each of the plurality of feature points, wherein each of the plurality of the feature points and the corresponding point on the second picture correspond to a same point on the object;
   determining plane projective transformation coefficients which include at least one coefficient representing a rotational transfer component and at least one coefficient representing a translation component so as to minimize an evaluation value that includes distance between each of transformed feature points, which are obtained by plane-projective-transforming the feature points on the first picture by using the plane projective transformation coefficients, and the corresponding point on the second picture and a weighting term having a value depending on the rotational transfer component; and plane-projective-transforming the first picture by using the plane projective transformation coefficients, to generate a pair of plane-projective-transformed picture and the second picture as a stereo picture.

6. A non-transitory computer readable recording medium recording a computer program for generating a stereo picture, the program causing a computer to execute: extracting a plurality of feature points from a first picture generated by photographing an object from a first position;

calculating coordinate of each point on a second picture generated by photographing the object from a second position different from the first position corresponding to each of the plurality of feature points, wherein each of the plurality of the feature points and the corresponding point on the second picture correspond to a same point on the object;

determining plane projective transformation coefficients which include at least one coefficient representing a rotational transfer component and at least one coefficient representing a translation component so as to minimize an evaluation value that includes distance between each of transformed feature points, which are obtained by plane-projective-transforming the feature points on the first picture by using the plane projective transformation coefficients, and the corresponding point on the second picture and a weighting term having a value depending on the rotational transfer component;

and plane-projective-transforming the first picture by using the plane projective transformation coefficients, to generate a pair of plane-projective-transformed picture and the second picture as a stereo picture.

7. A stereo picture generating device comprising:

at least one camera for photographing an object from a first position to generate a first picture, and photographing the object from a second position different from the first position to generate a second picture; and a processor adapted to extract a plurality of feature points from the first picture, calculate coordinate of each point on a second picture generated by photographing the object from a second position different from the first position corresponding to each of the plurality of feature points, wherein each of the plurality of the feature points and the corresponding point on the second picture correspond to a same point on the object, determine plane projective transformation coefficients which include at least one coefficient representing a rotational transfer component and at least one coefficient representing a translation component so as to minimize an evaluation value that includes distance between each of transformed feature points, which are obtained by plane-projective-transforming the feature points on the first picture by using the plane projective transformation coefficients, and the corresponding point on the second picture and a weighting term having a value depending on the rotational transfer component; and plane-projective-transform the first picture by using the plane projective transformation coefficients, to generate a pair of plane-projective-transformed picture and the second picture as a stereo picture.

* * * * *